US012623479B2

(12) United States Patent
Cape et al.

(10) Patent No.: US 12,623,479 B2
(45) Date of Patent: May 12, 2026

(54) FULLY MICRO-OPTIC SECURITY DOCUMENT

(71) Applicant: CRANE & CO., INC., Dalton, MA (US)

(72) Inventors: Samuel M. Cape, Woodstock, GA (US); Karin Mörck-Hamilton, Stockholm (SE); Fredrik Von Blixen-Finecke, Farsta (SE); Jason Van Gumster, Woodstock, GA (US); Jennifer Cowan, Marietta, GA (US); Ryan Toole, Washington D.C., DC (US); Gunnar Nehls, Stockholm (SE); Kara Zona, Marietta, GA (US); Jonathan D. Gosnell, Cumming, GA (US); Benjamin E. Bleiman, Cumming, GA (US)

(73) Assignee: Crane & Co., Inc., Dalton, MA (US)

( * ) Notice: Subject to any disclaimer, the term of this patent is extended or adjusted under 35 U.S.C. 154(b) by 0 days.

(21) Appl. No.: 18/186,008

(22) Filed: Mar. 17, 2023

(65) Prior Publication Data

US 2023/0226839 A1 Jul. 20, 2023

Related U.S. Application Data

(63) Continuation of application No. 17/275,162, filed as application No. PCT/US2019/050447 on Sep. 10, 2019, now Pat. No. 11,607,901.

(Continued)

(51) Int. Cl.

*B42D 25/29* (2014.01)
*B42D 25/324* (2014.01)

(Continued)

(52) U.S. Cl.

CPC ........... *B42D 25/29* (2014.10); *B42D 25/324* (2014.10); *B42D 25/342* (2014.10); *B42D 25/351* (2014.10); *B42D 25/45* (2014.10)

(58) Field of Classification Search

CPC .... B42D 25/29; B42D 25/324; B42D 25/342; B42D 25/351; B42D 25/45; B42D 25/328; D21H 21/40

(Continued)

(56) References Cited

U.S. PATENT DOCUMENTS

2002/0012447 A1 1/2002 Amidror et al.
2003/0179364 A1 9/2003 Steenblik et al.

(Continued)

FOREIGN PATENT DOCUMENTS

CN 102844198 A 12/2012
CN 102869518 A 1/2013

(Continued)

OTHER PUBLICATIONS

Notification to Grant Patent Right for Invention dated Mar. 28, 2023, in connection with Chinese Application No. 201980059053.1, 6 pages.

(Continued)

*Primary Examiner* — Justin V Lewis

(57) ABSTRACT

A security document (200) includes a secure substrate (205). The secure substrate includes a viewing side (209) and a backing side (211), and a micro-optic system (305, 321) providing an optically variable effect (OVE) (513) on the viewing side. The security document further includes a (Continued)

protective layer (225), and a mask layer (215) disposed between the protective layer and the backing side of the secure substrate.

15 Claims, 11 Drawing Sheets

Related U.S. Application Data

(60) Provisional application No. 62/728,957, filed on Sep. 10, 2018.

(51) Int. Cl.
*B42D 25/342* (2014.01)
*B42D 25/351* (2014.01)
*B42D 25/45* (2014.01)

(58) Field of Classification Search
USPC .............................. 283/72, 94, 98, 113, 901
See application file for complete search history.

(56) References Cited

U.S. PATENT DOCUMENTS

| | | | | |
|---|---|---|---|---|
| 2007/0241553 | A1 | 10/2007 | Heim et al. | |
| 2009/0297805 | A1 | 12/2009 | Dichtl | |
| 2010/0201115 | A1 | 8/2010 | Geuens | |
| 2010/0258635 | A1* | 10/2010 | Jones | G06K 19/08 235/487 |
| 2011/0095518 | A1 | 4/2011 | Hoffmuller et al. | |
| 2013/0056971 | A1 | 3/2013 | Holmes | |
| 2014/0312607 | A1* | 10/2014 | Tompkin | B42D 25/45 283/85 |
| 2015/0146297 | A1 | 5/2015 | Commander et al. | |
| 2017/0121910 | A1 | 5/2017 | Blake et al. | |
| 2017/0326900 | A1 | 11/2017 | Fuhse et al. | |
| 2018/0178577 | A1 | 6/2018 | Lister | |

FOREIGN PATENT DOCUMENTS

| | | | |
|---|---|---|---|
| CN | 104203589 | A | 12/2014 |
| JP | 2003094866 | A | 4/2003 |
| JP | 2004058605 | A | 2/2004 |
| JP | 2009262384 | A | 11/2009 |
| JP | 2009541873 | A | 11/2009 |
| JP | 2011170351 | A | 9/2011 |
| JP | 2013537640 | A | 10/2013 |
| JP | 2017074791 | A | 4/2017 |
| WO | 2011163298 | A1 | 12/2011 |
| WO | 2017163062 | A1 | 9/2017 |
| WO | 2017177278 | A1 | 10/2017 |

OTHER PUBLICATIONS

Notice of Acceptance for Patent Application dated May 1, 2023 in connection with Australian Application No. 2019340383, 3 pages.
Notice of Reasons for Refusal dated May 9, 2023 in connection with Japanese Application No. 2021-512621, 11 pages.
Examination Report dated Nov. 3, 2023, in connection with Mexican Application No. MX/a/2020/013861, 6 pages.
International Search Report and Written Opinion of the International Searching Authority dated Dec. 3, 2019, in connection with International Application No. PCT/US2019/050447, 9 pages.
Official Action dated Mar. 29, 2022, in connection with Russian Application No. 2021101565, 14 pages.
The First Office Action dated Apr. 27, 2022, in connection with Chinese Application No. 201980059053.1, 17 pages.
Supplementary European Search Report dated May 20, 2022, in connection with European Application No. 19859496.2, 5 pages.
Office Action dated Aug. 8, 2022, in connection with Australian Patent Application No. 2019340383, 3 pages.
Office Action dated Aug. 11, 2022, in connection with Russian Patent Application No. 2021101565, 10 pages.
Second Office Action dated Nov. 24, 2022, in connection with Chinese Application No. 201980059053.1. 13 pages.
Examination Report dated Nov. 28, 2022, in connection with Indian Application No. 202027056975, 6 pages.
Examination Report No. 2 dated Dec. 15, 2022, in connection with Australian Application No. 2019340383, 3 pages.
Decision to Grant dated Jan. 9, 2023, in connection with Russian Application No. 2021101565, 16 pages.
Decision of Refusal dated Oct. 10, 2023, in connection with Japanese Application No. 2021-512621, 7 pages.
Hearing Notice dated Oct. 30, 2023, in connection with Indian Application No. 202027056975, 2 pages.
Communication pursuant to Article 94(3) EPC dated Mar. 21, 2024, in connection with European Application No. 19859496.2, 5 pages.
Communication pursuant to Article 94(3) EPC, in connection with European Application No. 19859496.2, 7 pages.
Examination Report dated Aug. 14, 2024, in connection with Australian Application No. 2023214324, 3 pages.
Notice of Preliminary Rejection dated Sep. 4, 2024, in connection with Korean Application No. 10-2020-7037334, 17 pages.
Notice of Reasons for Refusal dated Jan. 7, 2025, in connection with Japanese Application No. 2024-009375, 10 pages.
Re-examination Report dated Mar. 7, 2025, in connection with Australian Application No. 2019340383, 5 pages.
First Examination Report dated Oct. 22, 2025, in connection with Indian Application No. 202328081916, 6 pages.

* cited by examiner

FULLY MICRO-OPTIC SECURITY DOCUMENT

CROSS-REFERENCE TO RELATED APPLICATIONS

This application is a Continuation of U.S. Non-Provisional application Ser. No. 17/275,162, filed Mar. 10, 2021, which is 371 National Stage of International Application No. PCT/US2019/050447, filed Sep. 10, 2019, which claims the benefit of U.S. Provisional Application No. 62/728,957, filed Sep. 10, 2018, the disclosures of which are herein incorporated by reference in their entirety.

TECHNICAL FIELD

This disclosure is generally directed to security documents (for example, banknotes) which provide significantly enhanced resistance against the harvesting of hard-to-duplicate security features (for example, micro-optic features) for the production of counterfeit bills.

SUMMARY

This disclosure provides a fully micro-optic security document.

In a first embodiment, a security document includes a secure substrate, the secure substrate having a viewing side and a backing side, and a micro-optic system providing an optically variable effect (OVE) on the viewing side. The security document also includes a protective layer and a mask layer disposed between the protective layer and the backing side of the secure substrate.

Other technical features may be readily apparent to one skilled in the art from the following figures, descriptions, and claims.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

Before undertaking the DETAILED DESCRIPTION below, it may be advantageous to set forth definitions of certain words and phrases used throughout this patent document. The term "couple" and its derivatives refer to any direct or indirect communication or interaction between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Definitions for other certain words and phrases are provided throughout this patent document. Those of ordinary skill in the art should understand that in many if not most instances, such definitions apply to prior as well as future uses of such defined words and phrases.

DETAILED DESCRIPTION

FIGS. 1 through 5, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged payment apparatus.

Figure 1:
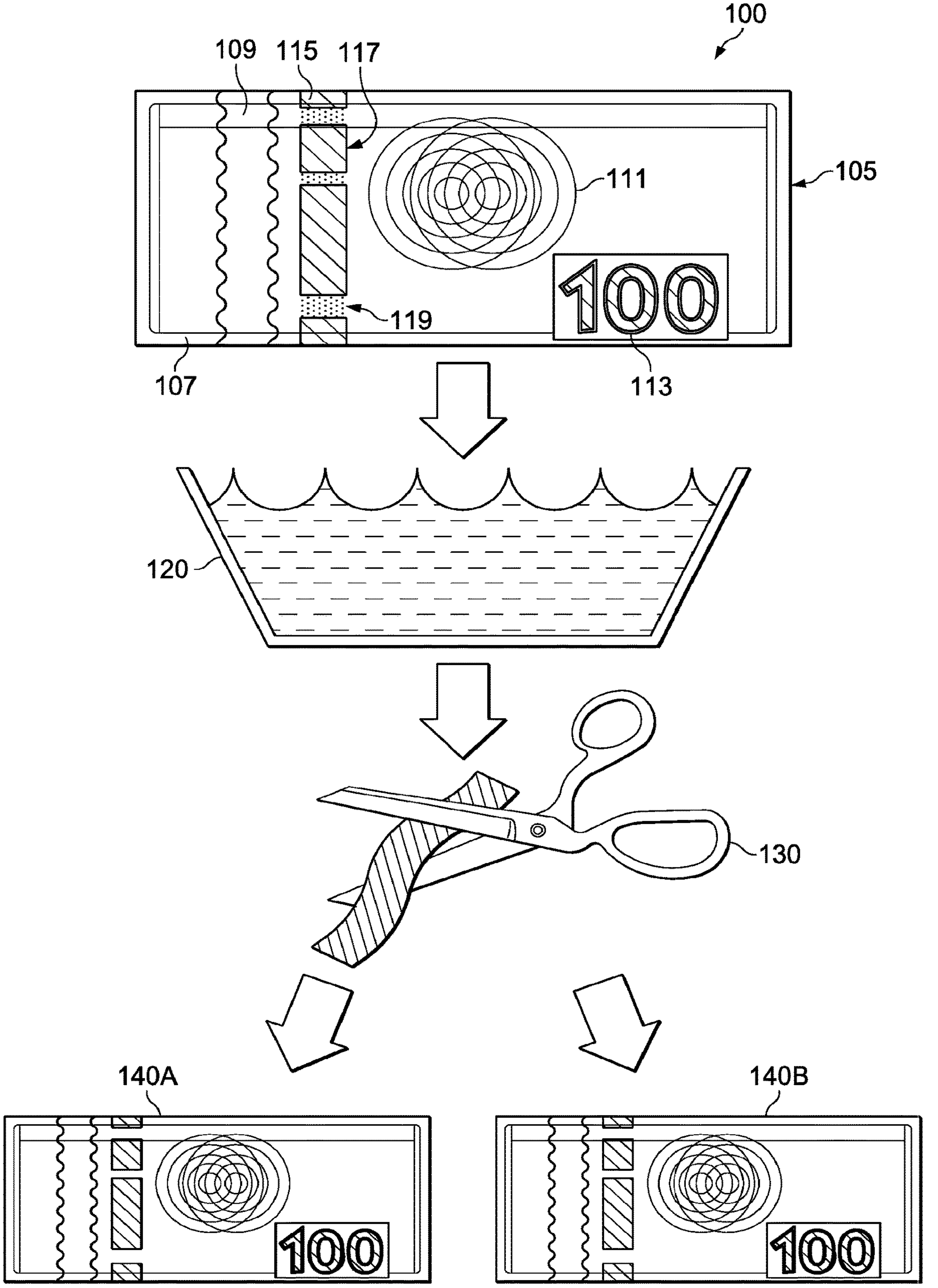
FIG. 1 illustrates, by way of background, at least one technical problem addressed by certain embodiments according to this disclosure.

By way of background and exposition of at least one technical problem addressed by certain embodiments according to this disclosure, FIG. 1 illustrates an example 100 of a mechanism by which security features of one authentic security document 105 (in this example, a banknote) can be harvested and used to produce two counterfeit security documents of serviceable quality to malicious actors.

Referring to the example of FIG. 1, an example of a security document 105 is provided. As shown in the figure, security document 105 comprises a substrate 107 incorporating a plurality of constructional features which provide visible and invisible indicia of the authenticity of security document 105. Examples of constructional features which provide invisible indicia of the document's authenticity include, without limitation, magnetic inks or machine readable features (for example, radio frequency identification ("RFID")) antenna attached to, or embedded in, substrate 107.

Examples of constructional features which provide visible indicia of authenticity include watermarks, printed effects, specialty inks, and security devices formed in, applied to, or embedded in substrate 107. In this illustrative example, the constructional features of security document 105 which provide visible indicia of authenticity include a watermark 109, which in some embodiments, is formed through the use of a patterned dandy roll during the manufacture of the paper of substrate 107. Further examples of constructional features of security document 105 which provide visual indicia of authenticity include intaglio design 111, which comprises a hard-to-reproduce pattern of lines, which due to the fine resolution of the pattern and use of intaglio printing techniques, produces a characteristic moiré interference effect, with a distinctive surface texture. In this illustrative example, the constructional features of security document 105 which provide visual indicia of the document's authenticity include areas 113 printed with specialized, hard-to-obtain inks, such as optically variable inks or color shifting inks, whose appearance changes in response to changes in the angle of incidence of light hitting the ink. Constructional features which provide visible indicia of the authenticity of security document 105 can also include security devices 115. In some embodiments, security device 115 comprises a section of thin material (for example, a narrow ribbon of a polymer substrate) supporting one or more arrays of micro- or nano-scale optical structures, for example, lenses, icon structures, or diffraction gratings, which, collectively produce a distinctive optical effect. Examples of such optical effects include, without limitation, an optically variable effect, such as a moiré magnification effect (sometimes referred to as a "synthetically magnified image" or a "synthetic image"), integral imaging effects, a color shift, or a hologram.

Improvements in imaging and printing technology, as well as criminal resourcefulness have provided malicious actors with the ability and materials to produce counterfeit security documents built around paper substrates providing serviceable facsimiles of many of the above-described constructional features providing visible indicia of security documents' authenticity provided on substrate 107. Given the tiny scale of the optical structures in security devices 115, and the institutional controls on certain of the tools, materials and technology involved in the production of security devices 115, most malicious actors do not presently have the means or technical know-how to copy security devices 115.

As a work-around to not being able to reproduce security device 115, malicious actors looking to produce counterfeit security documents "harvest" security devices from an authentic document for the purpose of incorporating parts of the harvested security devices into one or more counterfeit security documents. Referring to the explanatory example of FIG. 1, security device 115 is a micro-optic thread spanning the width of security document 100. As shown in the figure, security device 115 is embedded into substrate 107 such that portions of security device 115 are visible through windows 117 in the substrate, and other portions of security device are concealed by bridges 119.

Referring to the explanatory example of FIG. 1, malicious actors can, in certain cases, remove security device 115 substantially intact through prolonged soaking of security document 100 in a solvent (for example, water or bleach) to release the adhesive bond between security device 115 and substrate 107 or break down substrate 107. Once removed substantially intact, security device 115 can be carefully cut 130 into pieces which can be affixed to the surface of a plurality of counterfeit substrates 140*a* and 140*b*, or alternatively, to the surface of an embedded carrier thread to create, from an initial number of authentic security documents, a larger number of counterfeit documents, which, though not perfect copies of security document 105, carry sufficient visual indicia of authenticity to be easily circulated and mistaken for authentic documents by many users.

While not discussed in the explanatory example of FIG. 1, other methods of producing counterfeit security documents can be enabled by harvesting security device 115 substantially intact. For example, once harvested, security device 115 may be up-cycled to produce a counterfeit banknote of a higher denomination than security document 105. Alternatively, in cases where a security document is an identification document, or otherwise associated with an authorized actor, harvesting security device 115 substantially intact can facilitate the creation of a counterfeit security document associated with an unauthorized actor (for example, to create a fake passport).

As shown by the explanatory example of FIG. 1, the operative assumptions behind harvesting include, at a minimum, an assumption that the optical security device is separable from the substrate, and an assumption that the constructional features of the substrate which provide visual indicia of the authenticity of the security document can be serviceably reproduced by malicious actors. As discussed herein, certain embodiments according to this disclosure up-end these operating assumptions by providing a security document constructed around a secure substrate, which comprises a section of material exhibiting the flexibility and tensile strength suitable for the application, and at the same, provides a hard to reproduce optical effect, such as an optically variable effect. As such, certain embodiments according to this disclosure provide, at a minimum, the technical and practical benefits of denying malicious actors an opportunity to create counterfeit documents by applying harvested components from authentic documents to counterfeit substrates of criminally serviceable quality.

Figure 2:
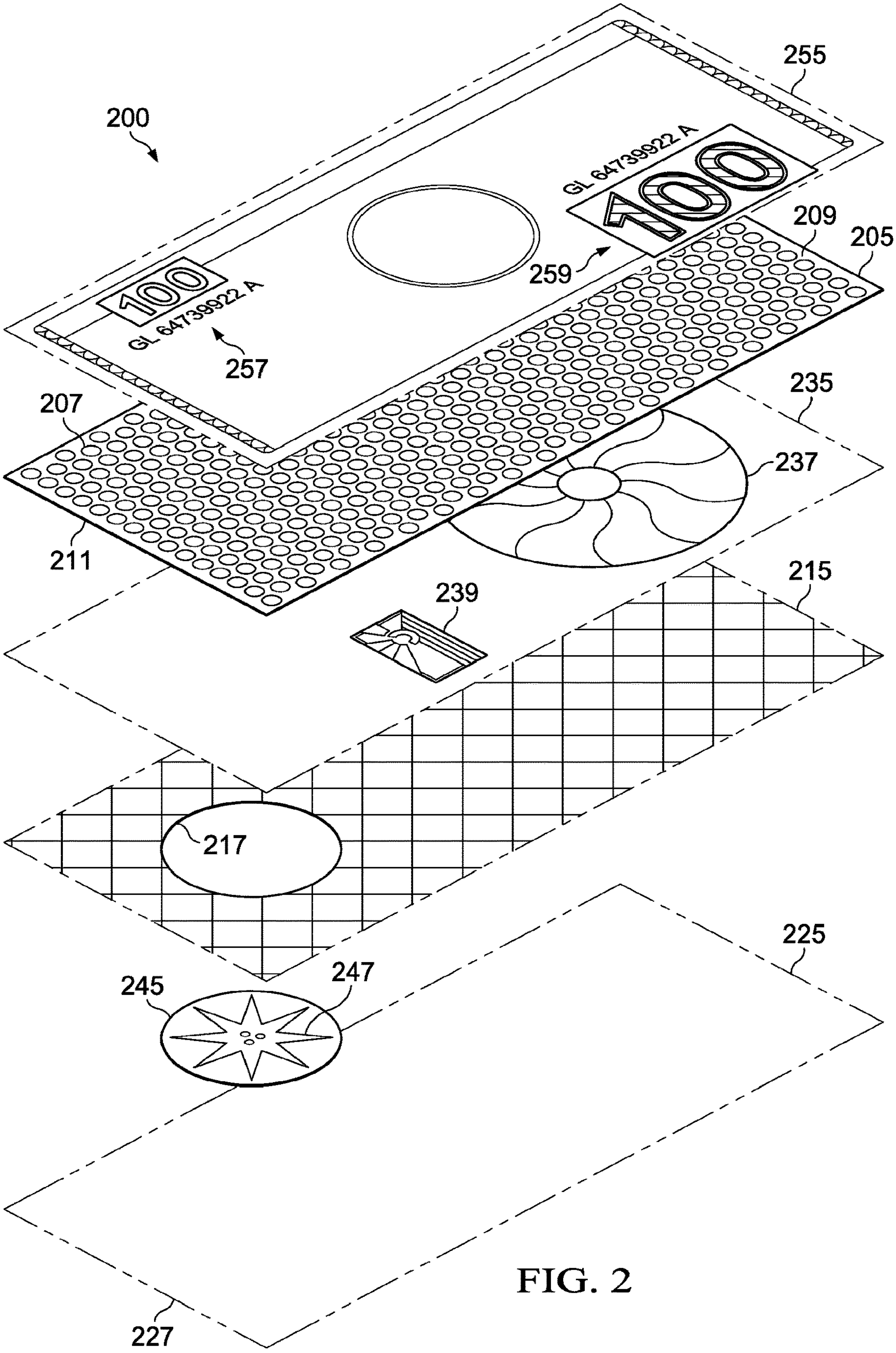
FIG. 2 illustrates an example of a security document according to various embodiments of this disclosure.

FIG. 2 illustrates, in an exploded view, elements of a security document 200 incorporating a secure substrate, according to various embodiments of this disclosure. While FIG. 2 illustrates a banknote as an example of a security document according to various embodiments of this disclosure, embodiments according to this disclosure are not so limited. Examples of security documents according to this disclosure include, without limitation, identification documents (for example, drivers' licenses), authentication labels on products which are counterfeiting targets (for example, handbags or watches), or financial documents (for example, cashier's checks or other negotiable instruments). In this illustrative example, the components numbered 205, 215, 225, 235, 245 and 255 in the figure control aspects of the appearance of security document 200 when viewed from above (e.g., facing element 255 in FIG. 2).

Referring to the non-limiting example of FIG. 2, security document 200 comprises a secure substrate 205 (for example, secure substrate 300 in FIG. 3), which provides an authenticating micro-structure based optical effect, and at the same time, is suitably flexible, durable and strong to serve as a structural anchor for security document 200. According to certain embodiments, secure substrate 205 comprises a sheet of material comprising microstructures which produce an optical effect which serves as visual indicia of the authenticity of security document 200. In some embodiments, the microstructures produce an optically variable effect (OVE), such as a moiré magnification effect of icon microstructures (sometimes also referred to as a "synthetic image" or a "synthetically magnified image"), a motion effect (wherein a synthetic image appears to "move" or change appearance relative to changes in viewing angle), or a color shift effect. As shown in the illustrative example of FIG. 2, in certain embodiments, the microstructures producing the optical effect include micro-scale focusing elements (for example, focusing element 207). Depending on embodiments, focusing element 207 is a refractive focusing element (for example, a microlens having a plano-convex profile, a concave profile, or a flat profile (such as a gradient index ("GRIN") lens)). In some embodiments, focusing element 207 is a reflective focusing element (for example, a micro-scale concave mirror). In some embodiments, the microstructures on secure substrate 205 are diffractive microstructures which produce a diffraction based effect (for example, color effects produced by diffractive gratings in secure substrate 205).

In some embodiments, secure substrate 205 comprises a viewing side 209 (visible in FIG. 2) and a backing side 211 (not visible in FIG. 2), which is opposite to viewing side 209.

As shown in the illustrative example of FIG. 2, security document 200 includes a mask layer 215, which is disposed between a protective layer 225 and backing side 211 of secure substrate 205. According to various embodiments, mask layer 215 comprises a sheet of material, or an applied coating which blocks a view of some or all of a print layer 235, secure substrate 205 and tactile layer 255 from viewpoints facing underside 227 of protective layer 225. In certain embodiments, mask layer 215 comprises a layer of an opacifying material, such as coating, or an opaque film having a color selected to enhance the visibility of an optical effect produced by secure substrate 205. In some embodiments, mask layer 215 has a color selected contrast with other features (for example, colors used in print layer 235). In embodiments where secure substrate 205 produces a moiré magnification effect, light colors (for example, white) may be especially suitable for an opacifying mask layer 215. In certain embodiments, mask layer 215 comprises a layer of reflective material, such as a metallic coating or an applied foil.

In certain embodiments, mask layer 215 comprises a window 217, through which light entering security document 200 through the underside 227 of protective layer 225 can pass through to secure substrate 205. In various embodiments, a patch 245 is provided in window 217. According to various embodiments, patch 245 comprises a section of material (for example, a fibrous material, such as currency paper, a polymeric material, or a metallic material) which provides a further optical indicia of authenticity to security document 200, and which is visible from one or both sides of security document 200. As shown in the illustrative example of FIG. 2, the further optical indicia of authenticity provided by patch 245 is, in some embodiments, a watermark 247. In some embodiments, the further optical indicia of authenticity provided by patch 245 is a printed design (for example, an offset or intaglio print design) or another optical security device (for example, a hologram). In this way, window 217 and patch 245 facilitate the incorporation of widely-recognized security features from legacy security documents in which the optical security device was a separate component from the substrate, into security documents according to this disclosure, which are constructed around a secure substrate 205. As a practical example, users who have for decades, authenticated banknotes by checking for the presence of a correctly formed watermark, can similarly authenticate security document 200.

In some applications, particularly where compatibility with legacy document processing machines (for example, bill readers in vending machines) or adoption by users familiar with older security documents are not gating issues, constructing security document 200 such that all of the visual information of the document is provided as an optical effect may be advantageous. However, in some applications, it is appropriate for a portion of the visual information provided by security document 200 be provided as static (not changing in appearance with respect to viewing angle or lighting conditions) features. Examples of visual information for which it may be advantageous to be provided as static features include, without limitation, printed features carried over from legacy security features (to facilitate reverse compatibility with existing document processing systems), and alphanumeric text providing essential information, such as denomination, addresses, or serial numbers (to facilitate machine readability this information, and to reduce eye strain on human readers).

Referring to the non-limiting example of FIG. 2, secure substrate 205 comprises one or more regions which exhibit gross transparency. As used in this disclosure, the term "gross transparency" encompasses the property of macro-level (i.e., rendered at a scale visible to the human eye) static features provided on or below backing side 211 of secure substrate to be visible through viewing side 209. In certain embodiments according to this disclosure, for example, certain embodiments where secure substrate 205 uses a layer of refractive focusing elements to provide a moiré magnification effect of micro-scale icon features in an icon layer, the tiny scale of the icon and lens features renders the entirety of secure substrate 205 grossly transparent.

According to some embodiments, static features which can be seen through grossly transparent regions of secure substrate 205 are provided in a print layer 235 applied to backing side 211 of secure substrate 205. In some embodiments according to this disclosure, static features (for example, geometric pattern 237 and flag 239) are printed using one or more printing techniques suitable for manufacturing security documents, including, without limitation, offset printing, flexographic printing, intaglio, gravure or inkjet printing. In some embodiments, the features of print layer 235 are applied to be in register with one or more of an optical effect provided by secure substrate 205, window 217, patch 245 or tactile layer 255. In some embodiments, print layer 235 is applied to backing side of secure substrate 205, and mask layer 215 is subsequently applied. In some embodiments, print layer 235 and mask layer 215 comprise a single integral layer.

Referring to the non-limiting example of FIG. 2, in some embodiments, security document 200 comprises tactile layer 255 comprising features applied to viewing side 209 of secure substrate 205, and which can be touched by users handling security document 200. According to some embodiments, tactile layer 255 comprises a transparent seal layer covering viewing side 209 of secure substrate 205. In some embodiments, such as, for example, embodiments in which viewing side 209 of secure substrate 205 has a substantially non-planar surface (for example, a surface bumpy with plano-convex microlenses) a seal layer can improve the overall performance of security document by filling in gaps between lenses in which contaminants can accumulate and diminish secure substrate 205's ability to provide an optical effect. In some embodiments where tactile layer 255 comprises a transparent seal layer, tactile features (for example, text 257 and denomination number 259) can be provided by printing material (for example, using intaglio printing, which produces a characteristic surface texture) on the surface of the seal layer. In various embodiments, where tactile layer 255 comprises a transparent seal layer, tactile features can be provided by creating (for example, by embossing) variations in the thickness of seal layer. In certain embodiments, where tactile layer 255 does not comprise a transparent seal layer, tactile features are created by printing material directly onto viewing side 209 of secure substrate 205. According to various embodiments, the tactile features (for example, features 257 and 259) of tactile layer 255 are formed to be in register with one or more of an optical effect provided by secure substrate 205, features of print layer 235, window 217, or patch 245.

Figure 4H:
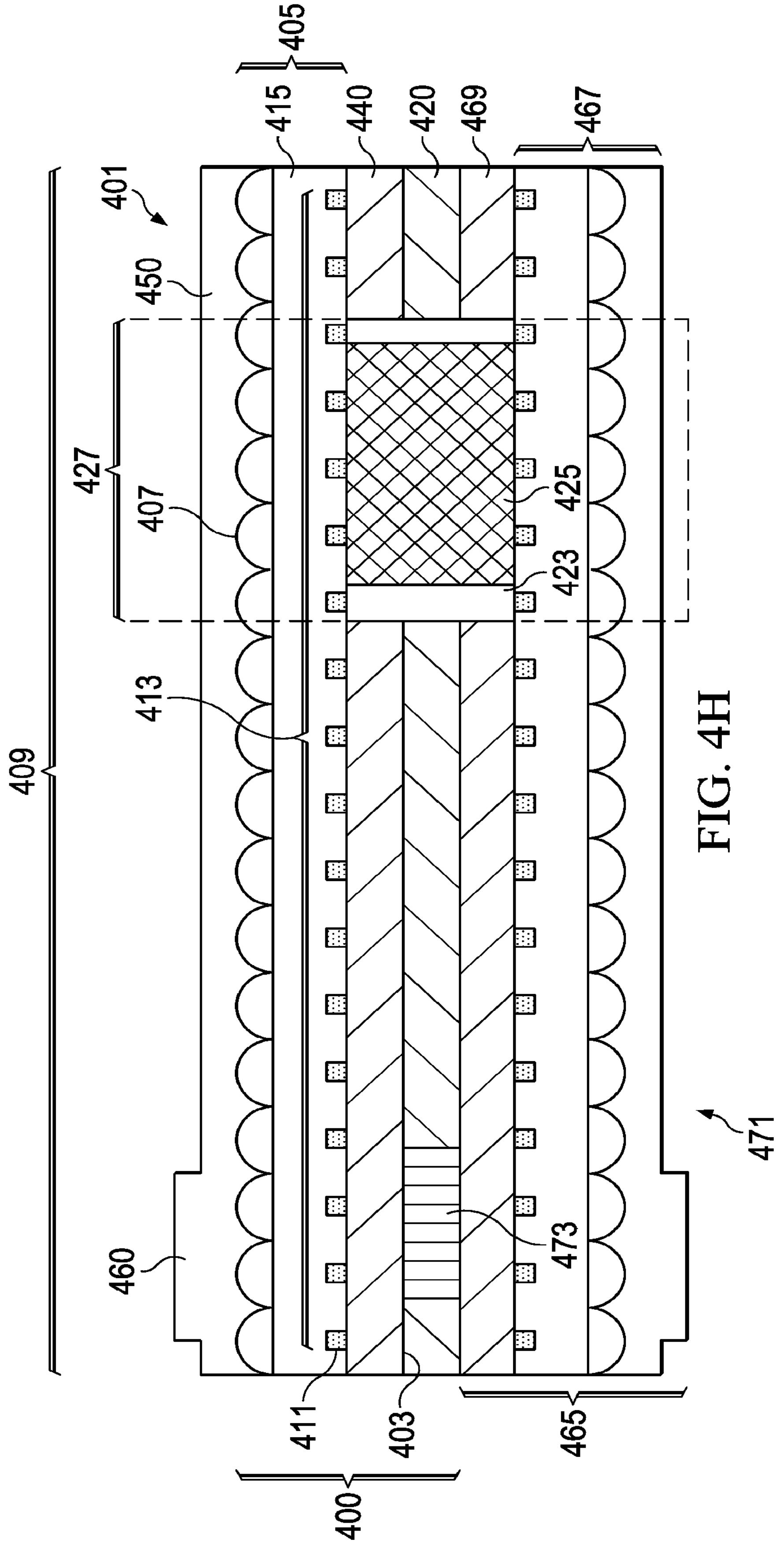
Figure 5:
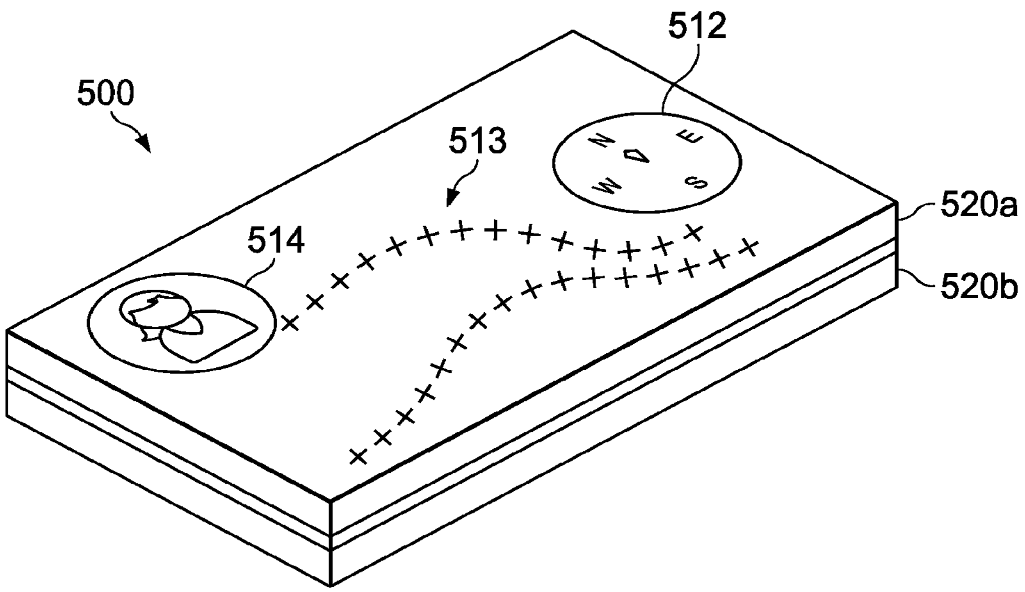
FIG. 5 illustrates an example of a security document according to at least one embodiment of this disclosure.

As shown in the illustrative example of FIG. 2, security document 200 comprises a protective layer 225. According to various embodiments, protective layer 225 comprises a single or multilayer structure which protects the thin (for example, a reflective foil used as mask layer 215), or delicate (for example, patch 245) structures of security document from abrasion and exposure to destructive contaminants. In some embodiments, protective layer 225 comprises a sheet of material (for example, a thin polymeric film or fibrous material, such as paper) adhered to mask layer 215. In various embodiments according to this disclosure, protective layer 225 comprises an applied coating of a suitably durable material (for example, a light curable resin suitable for creating seal layer 340 in FIG. 3). In some embodiments, protective layer 225 is integral with (for example, a single layer of the same material) mask layer 215. According to certain embodiments, protective layer 225 comprises a multilayer structure constructed around a second secure substrate (for example, as shown in FIGS. 4H and 5 of this disclosure).

Figure 3:
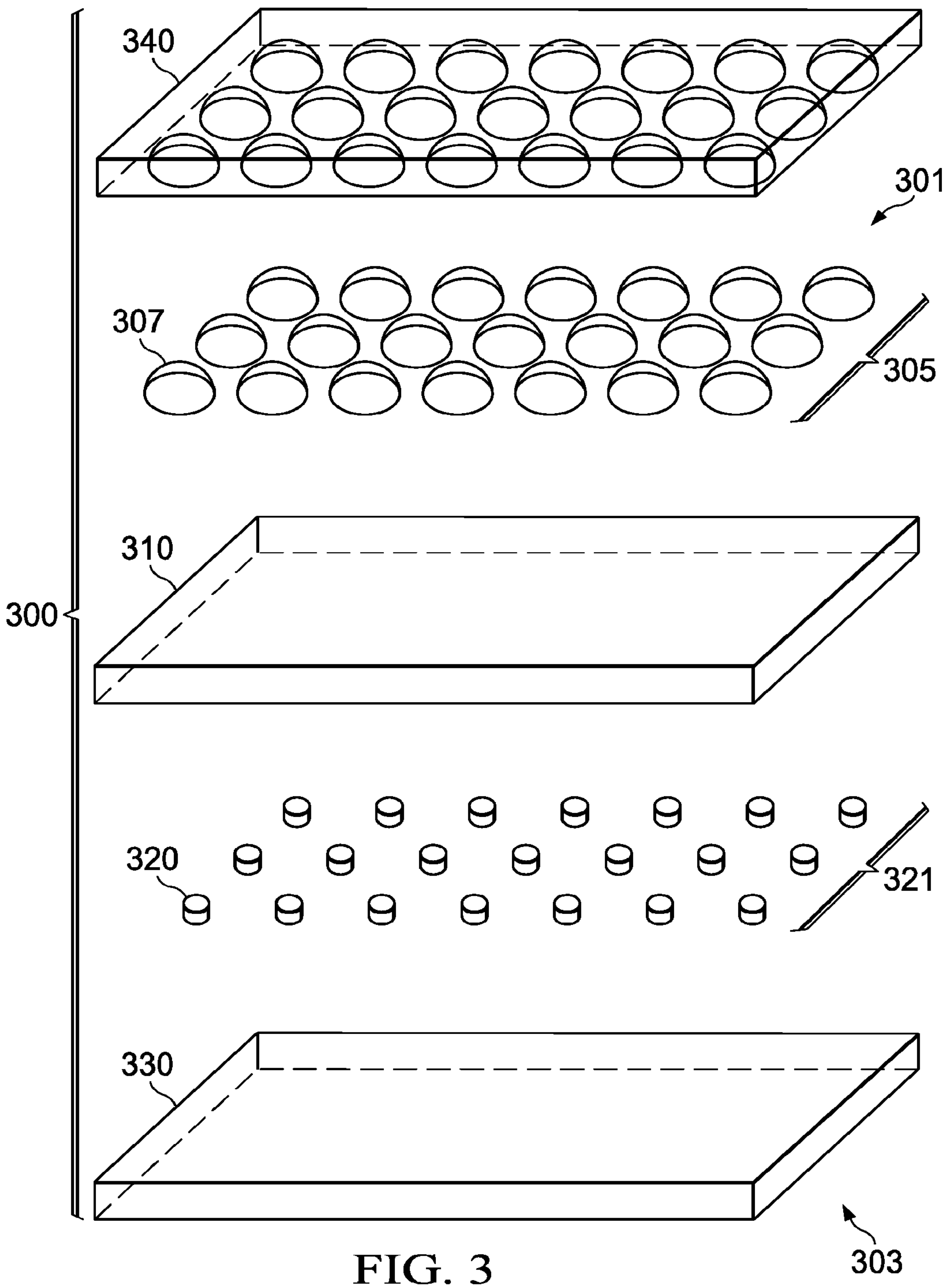
FIG. 3 illustrates an example of a secure substrate according to certain embodiments of this disclosure.

FIG. 3 illustrates structural aspects of an example of a secure substrate 300 according to various embodiments of this disclosure. For reference, FIG. 3 is oriented such that viewing side 301 of secure substrate appears near the top of the figure, and backing surface 303 appears at the bottom of the figure.

Referring to the non-limiting example of FIG. 3, in certain embodiments, secure substrate 300 comprises, a plurality of focusing elements 305 (including, for example, focusing element 307), and an arrangement of image icons 321 (including, for example, image icon 320). According to various embodiments, each focusing element of plurality of focusing elements 305 has a footprint, in which one or more image icons of arrangement of image icons 321 is positioned proximate to the focal point of the focusing element, such that at certain viewing angles, the focusing element focuses upon the image icon. Collectively, the focusing elements of plurality elements 305 magnify portions of arrangement of image icons 321 to produce a moiré magnification effect (also referred to as a "synthetically magnified image" or more briefly, a "synthetic image") wherein the individually microscopic image icons are collectively magnified by the plurality of focusing elements 305 to produce an image which dynamically reacts (for example, by appearing to move, or change colors) in response to shifts in viewing angle. In some embodiments, in conjunction with the above-described moire magnification effects, plurality of focusing elements 305 may operate with arrangement of image icons 321 to produce an integral image. As used in this disclosure, the term "integral image" encompasses a visual effect produced by as micro-optic system based on processing a set of viewpoint images to produce an image layer, which is used to define the configuration of arrangement of image icons 321, or a portion thereof. WIPO Publication WO 2013/163287 entitled "Security Device For Projecting a Collection of Synthetic Images," provides a non-limiting example of integral images, according to certain embodiments of this disclosure. Being difficult, if not impossible, for many malicious actors to reproduce, the above-described moiré magnification effect is, in many cases, a trusted visual indicia of the authenticity of a security document constructed around secure substrate 300.

According to certain embodiments, plurality of focusing elements 305 comprises a planar array of micro-optic focusing elements. In some embodiments, the focusing elements of plurality of focusing elements 305 comprise micro-optic refractive focusing elements (for example, plano-convex or GRIN lenses). Refractive focusing elements of plurality of focusing elements 305 are, in some embodiments, produced from light cured resins with indices of refraction ranging from 1.35 to 1.7, and have diameters ranging from 5 μm to 200 μm. In various embodiments, the focusing elements of plurality of focusing elements 305 comprise reflective focusing elements (for example, very small concave mirrors), with diameters ranging from 5 μm to 50 μm. While in this illustrative example, the focusing elements of plurality of focusing elements 305 are shown as comprising circular piano-convex lenses, other refractive lens geometries, for example, lenticular lenses, are possible and within the contemplated scope of this disclosure.

As shown in the illustrative example of FIG. 3, arrangement of image icons 320 comprises a set of image icons (including image icon 321), positioned at predetermined locations proximate to the focal points of focusing elements of plurality of focusing elements 305. According to various embodiments, the individual image icons of arrangement of image icons 320 comprise regions of light cured material associated with the focal path of structured light (for example, collimated UV light) light passing through plurality of focusing elements 305 from a projection point associated with one or more predetermined ranges of viewing angles. In some embodiments, the individual image icons of arrangement of image icons 320 are provided within a structured image icon layer, comprising structures for retaining volumes of pigmented material. In some embodiments, the individual image icons of arrangement of image icons 320 are not provided within a structured image icon layer. As used in this disclosure, the term "structured image layer" encompasses a layer of material (for example, a light-curable resin) which has been embossed, or otherwise formed to comprise structures (for example, recesses, posts, grooves, or mesas) for positioning and retaining image icon material. According to various embodiments, the individual image icons of arrangement of image icons 321 are provided within a structured image layer, the structured image layer comprising one or more of voids, mesas, or posts, which act as retaining structures to hold micro- and nano-scale volumes of colored material. In some embodiments, the image icons of image icon layer 321 are formed by directionally curing light curable material through plurality of focusing elements 305, to control the viewing angles at which the focal points of focusing elements fall upon the image icons, and by extension, the viewing angles at which particular optical effects are visible.

As shown in the illustrative example of FIG. 3, in certain embodiments, secure substrate 300 includes an optical spacer 310. According to various embodiments, optical spacer 310 comprises a film of substantially transparent material which operates to position image icons of arrangement of image icons 320 in or around the focal plane of focusing elements of plurality of focusing elements 305. In certain embodiments according to this disclosure, optical spacer 310 comprises a manufacturing substrate upon which one or more layers of light curable material can be applied, to form one or more of arrangement of image icons 320 or plurality of focusing elements 305. In certain embodiments according to this disclosure, optical spacer 310 does not comprise a separate structure from plurality of focusing elements 305, but rather, is formed integrally (for example, by casting) to plurality of focusing elements 305.

According to various embodiments, secure substrate 300 comprises one or more regions of light-cured protective material 330 which occupy the spaces between the image icons of arrangement of image icons 320. In some embodiments, the arrangement of image icons 320 is first formed (for example, by selectively curing and removing liquid light-curable material on optical spacer 310), and then a layer of clear, light-curable material is applied to fill spaces between the image icons of arrangement of image icons 320 and then flood-cured to create a protective layer, which protects the image icons from being moved from their positions within the footprints of focusing elements of plurality of focusing elements 305. In certain embodiments, the light-curable material used to form arrangement of image icons 320 is a pigmented, ultraviolet (UV)-curable polymer.

In certain embodiments according to this disclosure, secure substrate 300 comprises a seal layer 340 on viewing side 301 of secure substrate 300. According to certain embodiments, seal layer 340 comprises a thin (for example, a 2 μm to 50 μm thick layer) of substantially clear material which interfaces on a lower surface with focusing elements of the plurality of focusing elements 305, and comprises an upper surface with less variation in curvature (for example, by being smooth, or by having a surface whose local undulations are of a larger radius of curvature than the focusing elements) than the plurality of focusing elements 305.

While FIG. 3 provides one example of a secure substrate 300 according to various embodiments, the present disclosure is not so limited. For example, while in FIG. 3, arrangement of image icons 321 is shown as being structurally distinct from plurality of focusing elements 305, in some embodiments, focusing elements and image icons can be provided in a single layer. For example, in some embodiments, the image icons can be provided as selectively positioned relief structures or "dimples" on the surface of an array of convex lenses (sometimes referred to as a "Gregison" lens). As a further example, in embodiments incorporating reflective focusing elements, the image icons may be provided as regions of color in a "layer" between the reflecting surfaces of the focusing elements. In such embodiments, image icons and focusing elements may be provided on a single side of an optical spacer, in contrast to the example of FIG. 3, wherein image icon 320 and focusing element 307 occupy different sides of optical spacer 310.

FIGS. 4A through 4H illustrate examples of security documents constructed using a secure substrate according to various embodiments of this disclosure. The examples discussed with reference to FIGS. 4A through 4H are illustrative of the wide range of potential configurations of security documents constructed around one or more secure substrates according to embodiments of this disclosure. Further embodiments and configurations beyond those described with reference to FIGS. 4A-4H are within the contemplated scope of this disclosure. For convenience, structural elements common to more than one figure are numbered similarly.

Figure 4A:
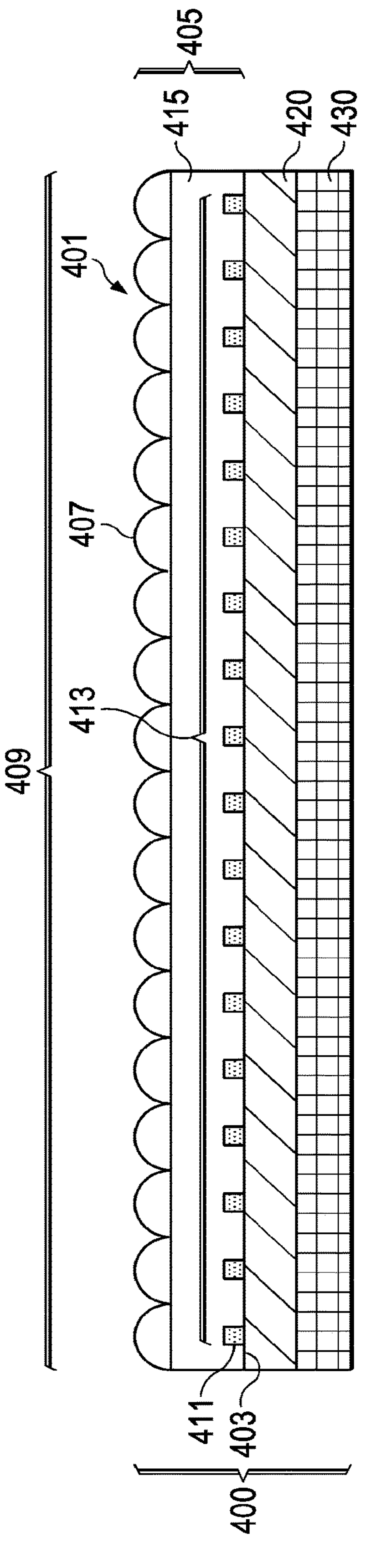
FIGS. 4A through 4H illustrate examples of security documents according to some embodiments of this disclosure.

Referring to the non-limiting example of FIG. 4A, a security document 400 according to various embodiments of this disclosure is shown in the figure. In some embodiments according to this disclosure, security document 400 comprises a secure substrate 405 (for example, secure substrate 300 in FIG. 3) having a viewing side 401 and a backing side 403, a protective layer 430 and a mask layer 420 disposed between backing side 403 of secure substrate 405 and protective layer 430. According to certain embodiment, secure substrate 405 comprises micro-scale optical structures which produce an optical effect on the viewing side which is an optical indicia of the authenticity of security document 400.

According to certain embodiments, secure substrate 405 provides an optically variable effect, such as a moiré magnification effect, through patterns in the incidence of the points of focus of focusing elements (for example, focusing element 407) of a layer of focusing elements 409 relative to image icons (for example, image icon 411) of a layer of image icons 413. In some embodiments, secure substrate 405 comprises an optical spacer 415. As shown in the illustrative example of FIG. 4A, optical spacer 415 comprises a carrier film having first and second sides. According to some embodiments, layer of focusing elements 409 is provided on the first side of optical spacer 415, and layer of image icons 413 is provided on the second side of optical spacer 415. In some embodiments, both layer of focusing elements 409 and layer of image icons are provided on a same side of optical spacer 415. In various embodiments, one or more of optical spacer 415, layer of focusing elements 409 and layer of image icons 413 are integral to one another, such as by being iteratively constructed in layers of a common material (for example, a light-curable polymer).

While, in the illustrative example of FIG. 4A, security document 400 has discussed with respect to embodiments in which secure substrate 405 comprises optical microstructures providing an optically variable effect (for example, a moiré magnification effect) other embodiments, comprising a secure substrate whose microstructures produce a different optical effect (for example, an interference based effect, or diffractive effect) are within the contemplated scope of this disclosure, which is directed to embodiments of a security document which up-ends the assumption of the structural backbone of the security document is a substrate to which components containing optical effect-producing microstructures can be separated from.

Referring to the non-limiting example of FIG. 4A, mask layer 420 comprises a thin layer of material (for example, an applied layer or paint or a thin film of reflective or opaque material) which limits the visibility of structures provided between mask layer and viewing side 401 of secure substrate from the underside of the security document. According to various documents, security document 400 further comprises protective layer 430, which depending on embodiments, can be one or more layers of material which operate to shield the structures between mask layer 420 and viewing side 401 of secure substrate from contact with objects or solvents which may damage or degrade microstructures of secure substrate 405 (for example, image icon 411), or other security features and visual information of security document 400 (for example, a watermark applied in a window of 430 mask layer). In some embodiments, protective layer 430 comprises a sheet of a polymeric (for example, biaxially oriented polypropylene) or fibrous (for example, currency paper) material.

Figure 4B:
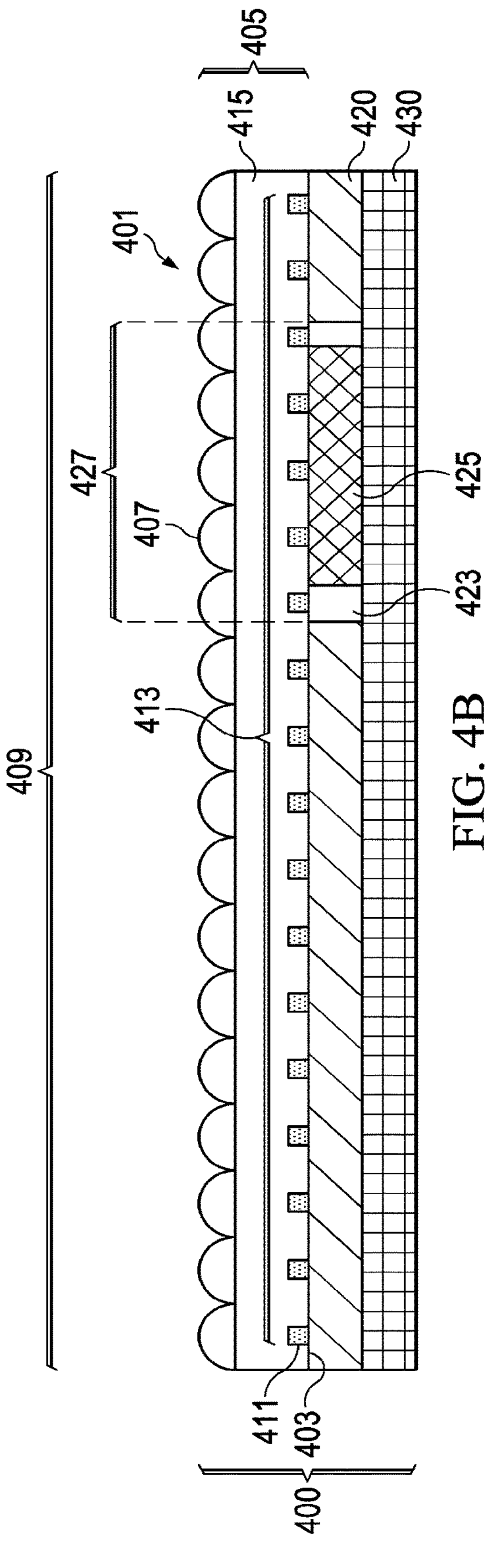

As noted elsewhere in this disclosure, constructing security documents around a secure substrate 405 which both provides, through microstructures of the secure substrate itself, a signature optical effect, which is difficult for most, if not all, malicious actors to reproduce), and at the same time, providing a structural foundation for the security document as a whole, permits a wide range of permutations of constructions and features which can be incorporated into security document. FIG. 4B illustrates an example of additional features (in this case, a window and a patch), which can be incorporated into security documents according to various embodiments of this disclosure.

Referring to the non-limiting example of FIG. 4B, in some embodiments, a window 423 is provided in mask layer 420. In certain embodiments according to this disclosure (for example, embodiments, in which mask layer 420 is an applied coating), window 423 is formed by not applying a coating to backing side 403 of secure substrate 405. In some embodiments, window 423 is preformed (for example, as a hole in a reflective or opaque film applied to backing side 403 of secure substrate 405. According to certain embodiments, window 423 is formed to be in register with a region 427 of secure substrate 405 which exhibits gross transparency, wherein gross transparency permits static features of a scale viewable by the naked eye to be visible through viewing side 401 of secure substrate 405. Depending on the construction of security document 400, window 423 may, by itself, be a feature of security document 400. As an illustrative example, in embodiments wherein protective layer 430 is transparent, window 423 permits light to pass through the entirety of security document 400, which by itself, can be a very distinctive feature of certain security documents, such as banknotes, which are often opaque across their full surface area.

In some embodiments, window 423 operates to facilitate the inclusion of a patch 425 of material providing an additional optical indicia of authenticity. According to certain embodiments, the optical indicia of authenticity provided by patch 425 is at least one of a watermark, a printed design (for example, a design printed using offset or intaglio print), or an additional optical security device, such as a hologram, or an optical security device providing a scattering-based visual effect (such as a change in color in response to transmitting or reflecting light).

As discussed elsewhere in this disclosure, the performance requirements for security document 400 may require that, in addition to being constructed around a secure substrate, a portion of the visual information provided by security document 400 be provided statically, rather than as part of an optical effect. From a performance standpoint, the inclusion of static features in security document, may be desirable to ensure backwards compatibility with legacy document handling machines, reduce eye strain on repeat viewers (for example, bank tellers or passport control agents), and facilitate speed and accuracy of automated processing techniques (for example, by permitting the use of mature, trusted processing techniques, such as Optical Character Recognition).

Figure 4C:
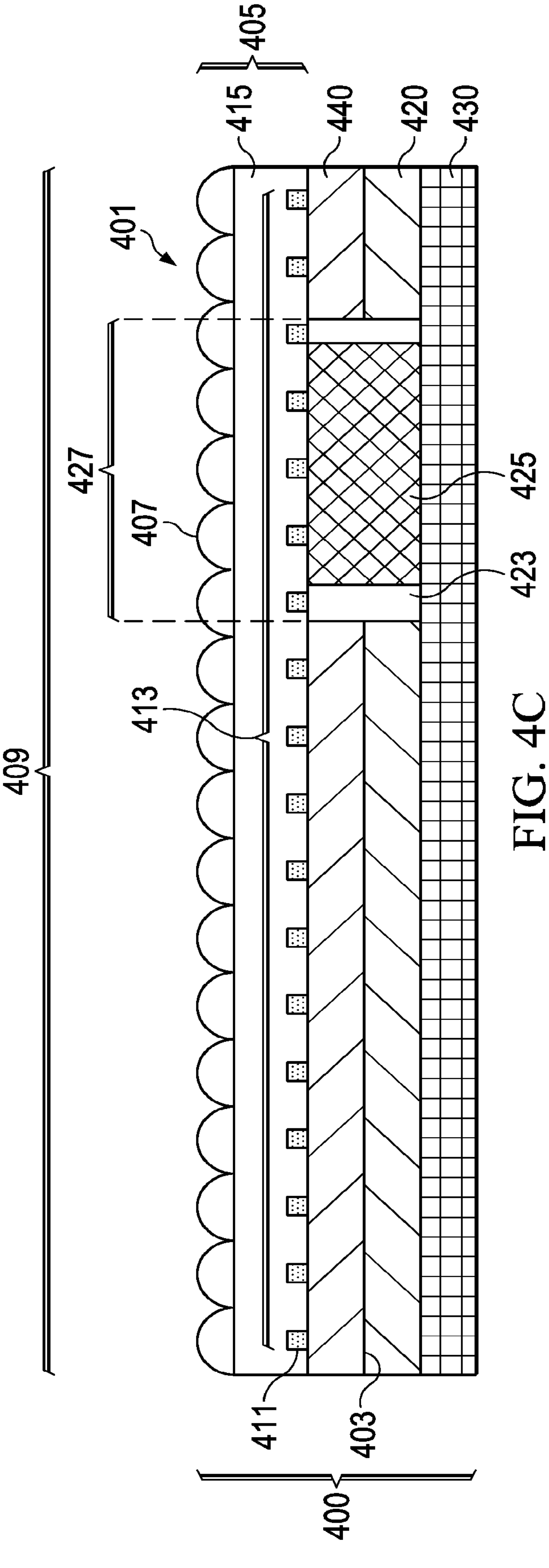

FIG. 4C illustrates an example of incorporating static features, in this case, in conjunction with a window 423 and patch 425, in a security document 400, according to various embodiments of this disclosure. Referring to the non-limiting example of FIG. 4C, in some embodiments, static features are applied through a print layer 440 applied to backing side 403 of secure substrate 405. Depending on embodiments, the static features of print layer 440 can be pre-formed, such as on a surface of film of material applied to backing side 403 of secure substrate 405. In various embodiments, the static features of print layer 440 can be printed onto backing side 403 of secure substrate by any suitable print technique, including, without limitation, inkjet printing or flexography. While in the illustrative example of FIG. 4C, print layer 440 is depicted as stopping at the boundaries of window 423, embodiments according to this disclosure are not so limited, and in certain embodiments, features of print layer 440 extend into window 423 and can also be applied to a patch 425 provided in window 423.

As noted elsewhere in this disclosure, the tactile "feel" of the surface of a security document (for example, a banknote) can both be an indicia of authenticity (for example, where the print technique leaves the inked pattern above the un-inked surfaces of the document) and a factor facilitating adoption of banknotes constructed around a secure substrate (for example, long-time users may appreciate how they feel the same as older, more familiar versions of the document).

Figure 4D:
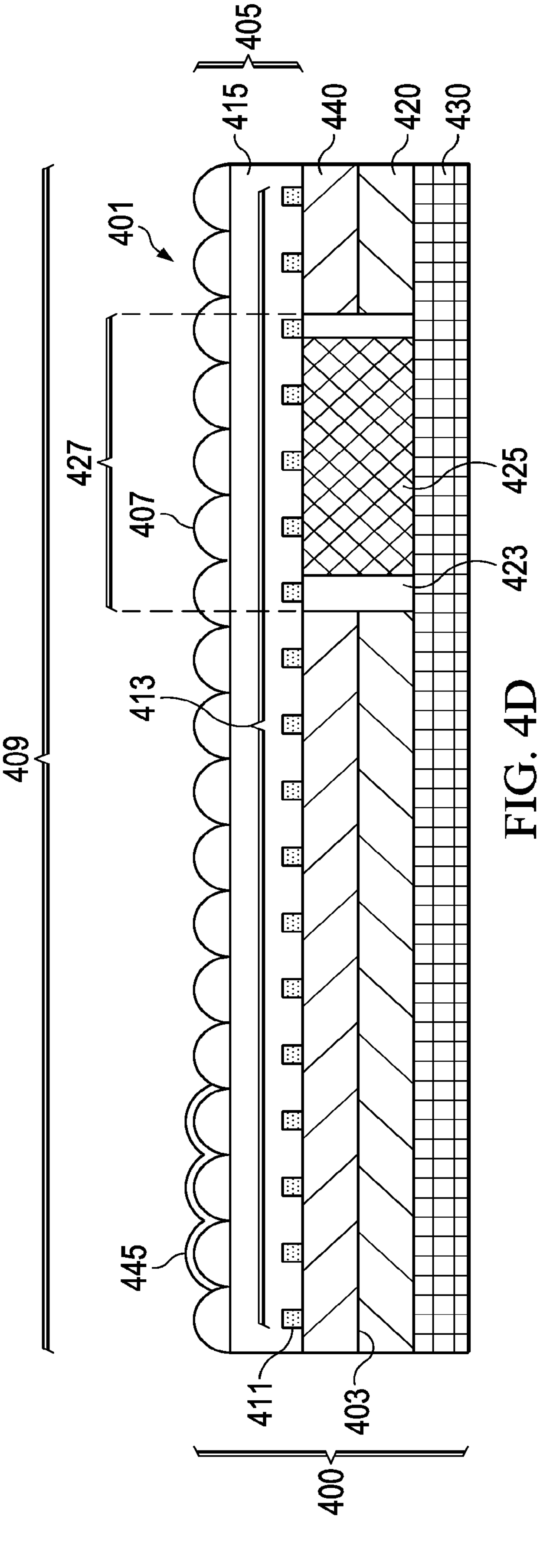

FIG. 4D illustrates an example of a security document 400 according to various embodiments of this disclosure which provides the above-described tactile features. According to various embodiments, features of a tactile layer 445 can be formed on viewing side 401 of secure substrate 405 by printing material (for example, a light-curable polymeric ink) onto portions of the viewing side 401 of secure substrate 405. According to certain embodiments, features of tactile layer 445 can also provide static features of the banknote (for example, a serial number or graphic design). Depending on the design parameters, and as a further feature to thwart counterfeiters, static features of security document 400 may be provided in both print layer 440, as well as through a tactile layer 445. Additionally, in certain embodiments according to this disclosure, static features provided in tactile layer 445 can be applied to be in register with other features of security document 400, including, without limitation, optical effects provided by secure substrate 405, window 423, patch 425 or features provided in print layer 440.

Figure 4E:
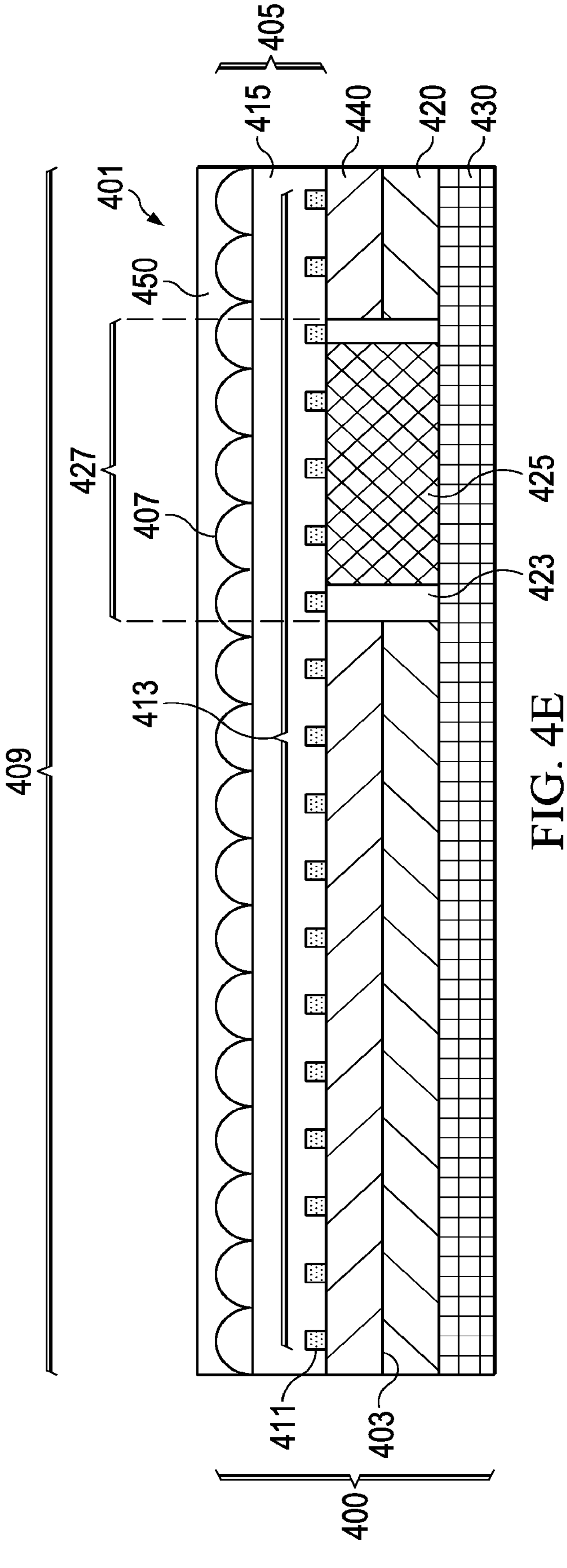

In some cases, the usage patterns (for example, banknotes which are heavily circulated or hoarded by users, leading to one or more of rapid wear or limited retirement and replacement) of particular security documents, favor the application of an additional layer of surface protection to isolate micro-optic structures of the secure substrate (for example, layer of focusing elements 409) from contact which can accelerate the wear of secure substrate 405, and to fill in voids or depressions in the surface of secure substrate 405 in which dirt, oils or other substances which can degrade the ability of secure substrate 405 to provide an authenticating optical effect. FIG. 4E illustrates an example of a secure document 400 according to various embodiments of this disclosure which incorporates such an additional layer of surface protection.

Referring to the non-limiting example of FIG. 4E, secure substrate 405 comprises a seal layer 450 applied to viewing side 401 of secure substrate 405. According to various embodiments, seal layer 450 comprises a substantially transparent layer of material which conforms to non-planar portions of viewing side 401 of secure substrate 405 and provides a substantially planar exterior surface of security document 400.

Figure 4F:
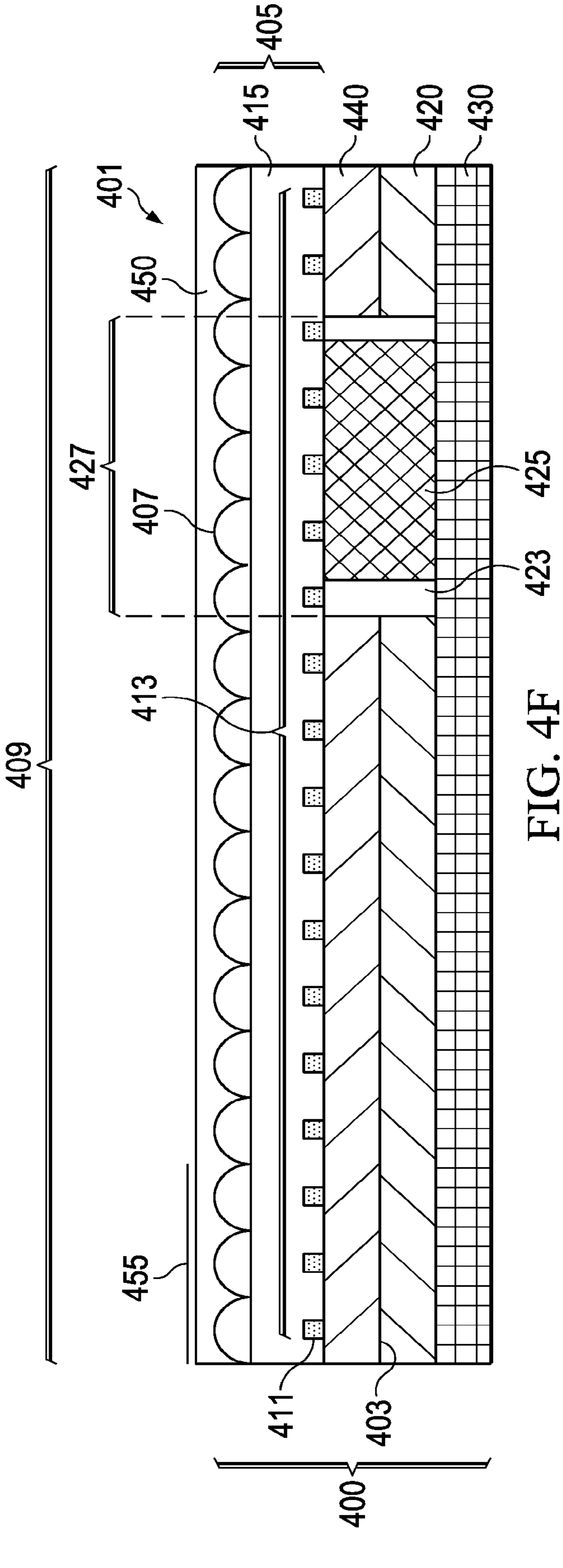

As noted elsewhere in this disclosure, use of a secure substrate to build security documents according to some embodiments of this disclosure permits a wide range of embodiments comprising combinations and reconfigurations constructional features. FIG. 4F illustrates a non-limiting example of how constructional features of a security document according to various embodiments of this disclosure can be mixed and matched.

Referring to the non-limiting example of FIG. 4F, security document 400 comprises a seal layer 450 applied to a viewing side 401 of secure substrate 405. According to various embodiments, features of a tactile layer 455 can be formed by applying material (for example, by printing) directly onto the surface of seal layer 450. While not shown in FIG. 4F, in some embodiments, features (for example, features of tactile layer 445) are printed onto viewing side 401 of secure substrate 405 before the addition of seal layer 450, and then, features of tactile layer 455 are subsequently applied. In some embodiments, the features of tactile layer 455 are applied to be in register with one or more other features of the security document, requiring tighter production controls and increasing the technical challenges of counterfeiting.

Figure 4G:
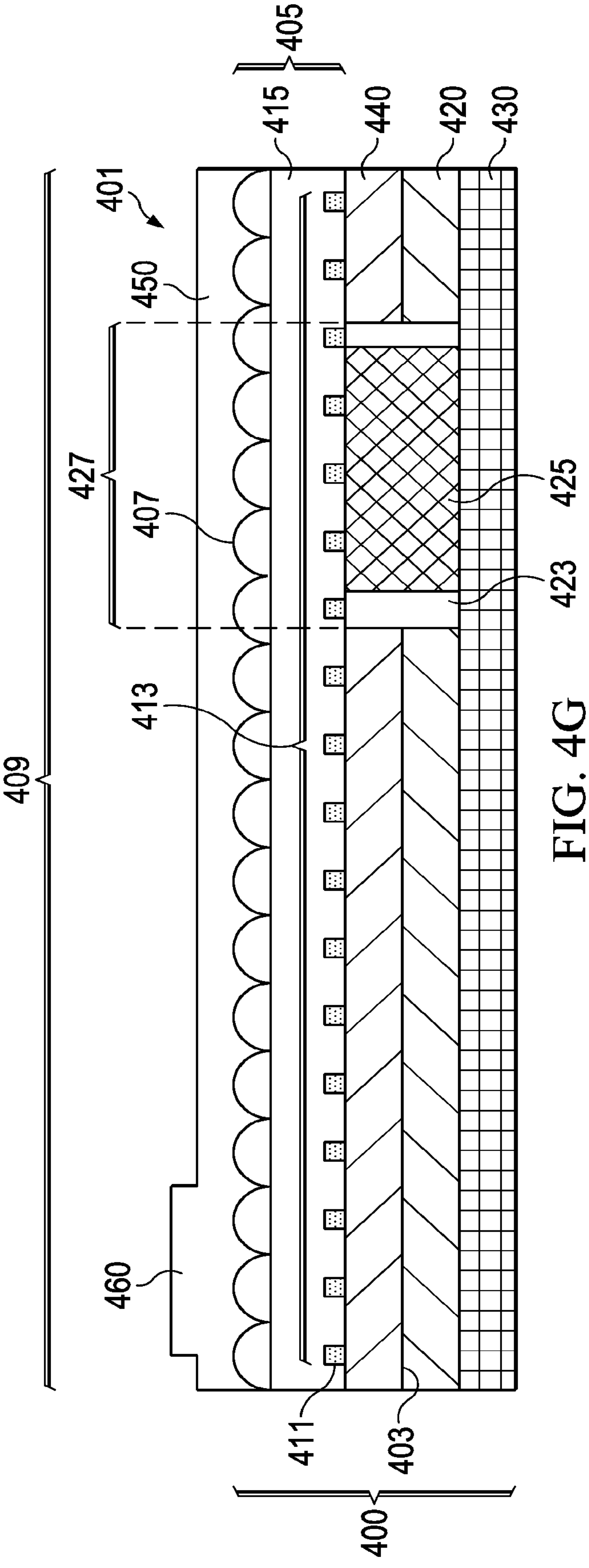

As noted elsewhere herein, the secure substrate architecture used to create security documents 400 according to certain embodiments of this disclosure, permits flexibility in forming certain components of this disclosure integrally, as a single component or layer of material (for example, in some embodiments, two or more of mask layer 420, protective layer 430 or print layer 440 can be formed integrally). FIG. 4G illustrates an example of such structural integration in a security document 400.

Referring to the non-limiting example of FIG. 4G, security document 400 comprises seal layer 450. In this illustrative example, features of a tactile layer 460 are formed by creating variations in a thickness of seal layer 450 (for example, by embossing the material of seal layer 450). In some embodiments, features of tactile layer 460 are in register with features provided in other layers of security document, thereby giving other features a "printed on" feel. In some embodiments, features of tactile layer 460 can be used to provide information of the security document in a non-visual manner (for example, as braille text, or other indicia familiar to visually impaired users).

In some embodiments, protective layer 430 comprises a single layer structure (for example, a transparent film or protective lacquer). In certain embodiments, mechanically shielding microstructures and potentially delicate components of security document 400 disposed below backing side 403 of secure substrate 405 can be performed by a protective layer 430 comprising a multi-layer protective structure.

FIG. 4H illustrates an example of a security document 400 utilizing a multi-layered protective layer 465, according to various embodiments of this disclosure. Referring to the illustrative example of FIG. 4H, in some embodiments, multi-layer protective layer 465 comprises elements of a security document, including a second secure substrate 467 and a second print layer 469. As shown in the non-limiting example of FIG. 4H, certain structures of security document 400 can function to provide visual information or support optical effects on not just one, but both sides of security document 400. For example, in FIG. 4H, a single mask layer 420 controls the passage of light through security document 400 to viewing side 401 of secure substrate 405, as well as viewing side 471 of second secure substrate 467. Similarly, in some embodiments, window 423 and patch 425 operate to provide visual information or an optical effect which is visible through regions of secure substrate 405 and second secure substrate 467 which exhibit gross transparency.

According to various embodiments, security document 400 further comprises one or more machine-readable security features, including, without limitation, radio frequency identification (RFID) antennas, magnetic readable strips, or other devices known in the art as "Level 3" features, which are detectable using specialized equipment, such banknote equipment manufacturer (BEM) devices.

As noted elsewhere, the examples described with reference to FIGS. 4A-4H of this disclosure are illustrative, and not limitative of embodiments according to this disclosure, which comprise, for example, different configurations of micro-optic structures within secure substrate 405, as well as different combinations and integrations of components described in the explanatory examples of FIGS. 4A through 4H.

FIG. 5 illustrates an example of a security document 500 constructed around a pair of secure substrates, according to various embodiments of this disclosure.

As discussed with, for example, security document 400 in FIG. 4H of this disclosure, in certain embodiments, a second secure substrate can be a protective layer for a first secure substrate. In the non-limiting example of FIG. 5, a further illustration of such a security document 500, wherein a pair of secure substrates serve as protective layers for each other, is provided. According to certain embodiments, security document 500 comprises a first secure substrate 520*a* (for example, secure substrate 300 in FIG. 3), and a second secure substrate 520*b* (for example, a second instance of secure substrate 300 in FIG. 3). In some embodiments according to this disclosure, micro-optic structures in first secure substrate 520*a* project a synthetic image to viewpoints proximate to security document 500. As an example of such a synthetic image, the rolling waves of "+" signs shown in the figure may appear to "float" above or below the surface of first secure substrate 520*a*. According to some embodiments, security document 500 comprises a patch 512, which is visible through portions of first secure substrate 520 which exhibit gross transparency. In various embodiments, security document 500 further comprises features of a tactile layer 514 applied to the viewing side of first secure substrate 520*a* as an intaglio-like print feature.

Examples of security documents according to certain embodiments of this disclosure include security documents comprising a secure substrate, the secure substrate comprising a viewing side and a backing side, and a micro-optic system providing an optically variable effect (OVE) on the viewing side, a protective layer, and a mask layer disposed between the protective layer and the backing side of the secure substrate.

Examples of security documents according to certain embodiments of this disclosure include security documents wherein the protective layer comprises a second secure substrate.

Examples of security documents according to certain embodiments of this disclosure include security documents wherein the mask layer comprises a layer of opacifying material.

Examples of security documents according to certain embodiments of this disclosure include security documents wherein the mask layer comprises a layer of reflective material.

Examples of security documents according to certain embodiments of this disclosure include security documents wherein the mask layer comprises a window.

Examples of security documents according to certain embodiments of this disclosure include security documents comprising a patch comprising an optical indicia of authenticity, wherein the patch is visible through the window of the mask layer.

Examples of security documents according to certain embodiments of this disclosure include security documents wherein the optical indicia of authenticity provided by the patch comprises at least one of, a watermark, an offset print design, an intaglio print design, or an optical security device.

Examples of security documents according to certain embodiments of this disclosure include security documents comprising a tactile feature disposed on the viewing side of the secure substrate.

Examples of security documents according to certain embodiments of this disclosure include security documents wherein the tactile feature comprises material printed on the viewing side of the secure substrate.

Examples of security documents according to certain embodiments of this disclosure include security documents wherein the tactile feature comprises intaglio print on the viewing side of the secure substrate.

Examples of security documents according to certain embodiments of this disclosure include security documents wherein the secure substrate comprises a layer of focusing elements, a layer of image icons, and an optical spacer, wherein the layer of focusing elements is disposed on a first side of the optical spacer, and wherein the layer of image icons comprises image icons disposed proximate to focal points of focusing elements of the layer of focusing elements.

Examples of security documents according to certain embodiments of this disclosure include security documents wherein the layer of focusing elements comprises refractive focusing elements.

Examples of security documents according to certain embodiments of this disclosure include security documents wherein the layer of focusing elements comprises reflective focusing elements.

Examples of security documents according to certain embodiments of this disclosure include security documents wherein the layer of image icons is disposed on a second side of the optical spacer.

Examples of security documents according to certain embodiments of this disclosure include security documents wherein the optical spacer is integral to the layer of focusing elements.

Examples of security documents according to certain embodiments of this disclosure include security documents wherein the layer of image icons is integral to the layer of focusing elements.

Examples of security documents according to certain embodiments of this disclosure include security documents wherein image icons of the layer of image icons are provided as relief structures in focusing elements of the layer of focusing elements.

Examples of security documents according to certain embodiments of this disclosure include security documents comprising a seal layer disposed on the viewing side of the secure substrate.

Examples of security documents according to certain embodiments of this disclosure include security documents comprising a seal layer disposed on the viewing side of the secure substrate.

Examples of security documents according to certain embodiments of this disclosure include security documents comprising a tactile feature provided as a variation in a thickness of the seal layer.

Examples of security documents according to certain embodiments of this disclosure include security documents wherein the optical spacer comprises a sheet of a transparent polymer.

Examples of security documents according to certain embodiments of this disclosure include security documents wherein the transparent polymer comprises at least one of polyethylene teraphthalate (PET), biaxially oriented polypropylene, polycarbonate, polyester, polypropylene or polyvinylchloride (PVC).

Examples of security documents according to certain embodiments of this disclosure include security documents wherein the OVE comprises a moiré magnification effect.

Examples of security documents according to certain embodiments of this disclosure include security documents wherein the secure substrate comprises a region exhibiting gross transparency, wherein the gross transparency permits static features disposed on or below the backing side of the secure substrate to be visible through the viewing side of the secure substrate.

Examples of security documents according to certain embodiments of this disclosure include security documents comprising a static feature printed on the backing side of the secure substrate.

Examples of security documents according to certain embodiments of this disclosure include security documents comprising a static feature provided as a variation in color in the mask layer.

Examples of security documents according to certain embodiments of this disclosure include security documents wherein the mask layer and the protective layer are provided as a single layer of material coupled to the backing side of the secure substrate.

Examples of security documents according to certain embodiments of this disclosure include security documents comprising a machine-readable security feature.

Examples of security documents according to certain embodiments of this disclosure include security documents comprising a tactile feature, wherein the tactile feature is in register with one or more of a window in the mask layer, a patch, a feature of a print layer, or the OVE.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A security document, comprising:

a secure substrate, the secure substrate comprising a viewing side and a backing side, and a micro-optic system having microstructures integrated within the secure substrate comprising a single layer, the micro-optic system providing an optically variable effect on the viewing side, wherein the secure substrate including the integrated microstructures provides a structural foundation for the security document;

a protective layer, wherein the microstructures of the secure substrate comprise:

focusing elements, wherein the focusing elements appear transparent on the viewing side, and wherein the focusing elements reflect, refract or provide an interference effect in light passing through the focusing elements;

image icons; and a machine-readable security feature; and an optical spacer within the secure substrate, wherein the layer of focusing elements is disposed on a first side of the optical spacer, and wherein the image icons are embedded within the optical spacer, and wherein the layer of image icons comprises image icons disposed proximate to focal points of the layer of focusing elements.

2. The security document of claim 1, wherein the machine-readable security feature comprises a radio frequency identification (RFID) antenna.

3. The security document of claim 1, wherein the machine-readable security feature comprises a magnetically-readable element.

4. The security document of claim 1, wherein the machine-readable security feature comprises a static feature.

5. The security document of claim 1, wherein the machine-readable security feature contacts the image icons.

6. The security document of claim 1, wherein the machine-readable security feature contacts the focusing elements.

7. The security document of claim 1, wherein the machine-readable security feature contacts the optical spacer.

8. The security document of claim 1, wherein the machine-readable security feature contacts the protective layer.

9. The security document of claim 1, further comprising a mask layer disposed between the protective layer and the backing side of the secure substrate.

10. The security document of claim 9, wherein the machine-readable security feature contacts the mask layer.

11. The security document of claim 9, wherein the mask layer comprises a layer of opacifying material.

12. The security document of claim 9, wherein the mask layer comprises a layer of reflective material.

13. The security document of claim 9, further comprising:

a patch comprising an optical indicia of authenticity, wherein the patch is visible through a window in the mask layer.

14. The security document of claim 13, wherein the optical indicia of authenticity provided by the patch comprises at least one of: a watermark, an offset print design, an intaglio print design, or an optical security device.

15. The security document of claim 1, wherein one or more of the optical spacer, the focusing elements, and the image icons are iteratively constructed in a same material of the secure substrate.

* * * * *